United States Patent
Luo et al.

(10) Patent No.: US 12,519,415 B2
(45) Date of Patent: Jan. 6, 2026

(54) SERVO SYSTEM AND CONTROL METHOD FOR SERVO SYSTEM

(71) Applicant: Hitachi Industrial Equipment Systems Co., Ltd., Tokyo (JP)

(72) Inventors: Zhiyuan Luo, Tokyo (JP); Takahiro Ikeda, Tokyo (JP); Satoshi Iimuro, Tokyo (JP); Kenji Takeda, Tokyo (JP)

(73) Assignee: HITACHI INDUSTRIAL EQUIPMENT SYSTEMS CO., LTD., Tokyo (JP)

( * ) Notice: Subject to any disclaimer, the term of this patent is extended or adjusted under 35 U.S.C. 154(b) by 161 days.

(21) Appl. No.: 18/564,632

(22) PCT Filed: Jun. 10, 2022

(86) PCT No.: PCT/JP2022/023395
§ 371 (c)(1),
(2) Date: Nov. 28, 2023

(87) PCT Pub. No.: WO2023/013245
PCT Pub. Date: Feb. 9, 2023

(65) Prior Publication Data
US 2024/0258951 A1 Aug. 1, 2024

(30) Foreign Application Priority Data
Aug. 3, 2021 (JP) ................................. 2021-127786

(51) Int. Cl.
*H02P 29/024* (2016.01)
(52) U.S. Cl.
CPC .................................. *H02P 29/024* (2013.01)
(58) Field of Classification Search
CPC ........ H02P 29/024; G05B 2219/33329; G05B 19/4063
(Continued)

(56) References Cited

U.S. PATENT DOCUMENTS 4,873,431 A 10/1989 Ito
8,659,254 B2 * 2/2014 Ueno ..................... G05B 19/18
318/602
(Continued)

FOREIGN PATENT DOCUMENTS

JP 53-118410 U 2/1977
JP 64-074558 A 3/1989
(Continued)

OTHER PUBLICATIONS

International Search Report of PCT/JP2022/023395 dated Aug. 9, 2022.
(Continued)

*Primary Examiner* — David Luo
(74) *Attorney, Agent, or Firm* — MATTINGLY & MALUR, PC

(57) ABSTRACT

The servo system includes a servo motor, an encoder for detecting rotation information regarding the position and speed of the servo motor, and a servo amplifier for controlling the driving of the servo motor using the rotation information. The servo amplifier includes an encoder communication interface configured by hardware, a processor for calculating a control command to control the servo motor based on an operation command and the rotation information input through the encoder communication interface, and a control unit for controlling the driving of the servo motor based on the control command. Then, the processor compares the rotation information directly received from the encoder with the rotation information input through the encoder communication interface and diagnoses that there is a failure when both the pieces of rotation information do not match each other.

12 Claims, 6 Drawing Sheets

(58) Field of Classification Search
USPC .............................. 318/400.21, 400.01, 700
See application file for complete search history.

(56) References Cited

U.S. PATENT DOCUMENTS

| | | | |
|---|---|---|---|
| 10,958,205 B2* | 3/2021 | Hashimoto | ............... G05D 3/12 |
| 2010/0164423 A1* | 7/2010 | Nakayama | ......... G05B 19/0425 |
| | | | 318/446 |
| 2012/0166857 A1 | 6/2012 | Iwahashi et al. | |
| 2014/0292875 A1 | 10/2014 | Liu et al. | |
| 2020/0274477 A1 | 8/2020 | Nakamura et al. | |

FOREIGN PATENT DOCUMENTS

| | | |
|---|---|---|
| JP | 01-277951 A | 11/1989 |
| JP | 02-025962 A | 1/1990 |
| JP | 10-307612 A | 11/1998 |
| JP | 2001-136786 A | 5/2001 |
| JP | 2007-050148 A | 3/2007 |
| JP | 2010-056161 A | 3/2010 |
| JP | 2014-523821 A | 9/2014 |
| JP | 2015-231255 A | 12/2015 |
| JP | 2017-147841 A | 8/2017 |
| JP | 2019-201448 A | 11/2019 |
| JP | 2019-201456 A | 11/2019 |
| JP | 2020-137327 A | 8/2020 |
| WO | 2011/030628 A1 | 3/2011 |
| WO | 2020/170440 A1 | 8/2020 |

OTHER PUBLICATIONS

Written Opinion of the International Searching Authority of PCT/JP2022/023395 dated Aug. 9, 2022.

* cited by examiner

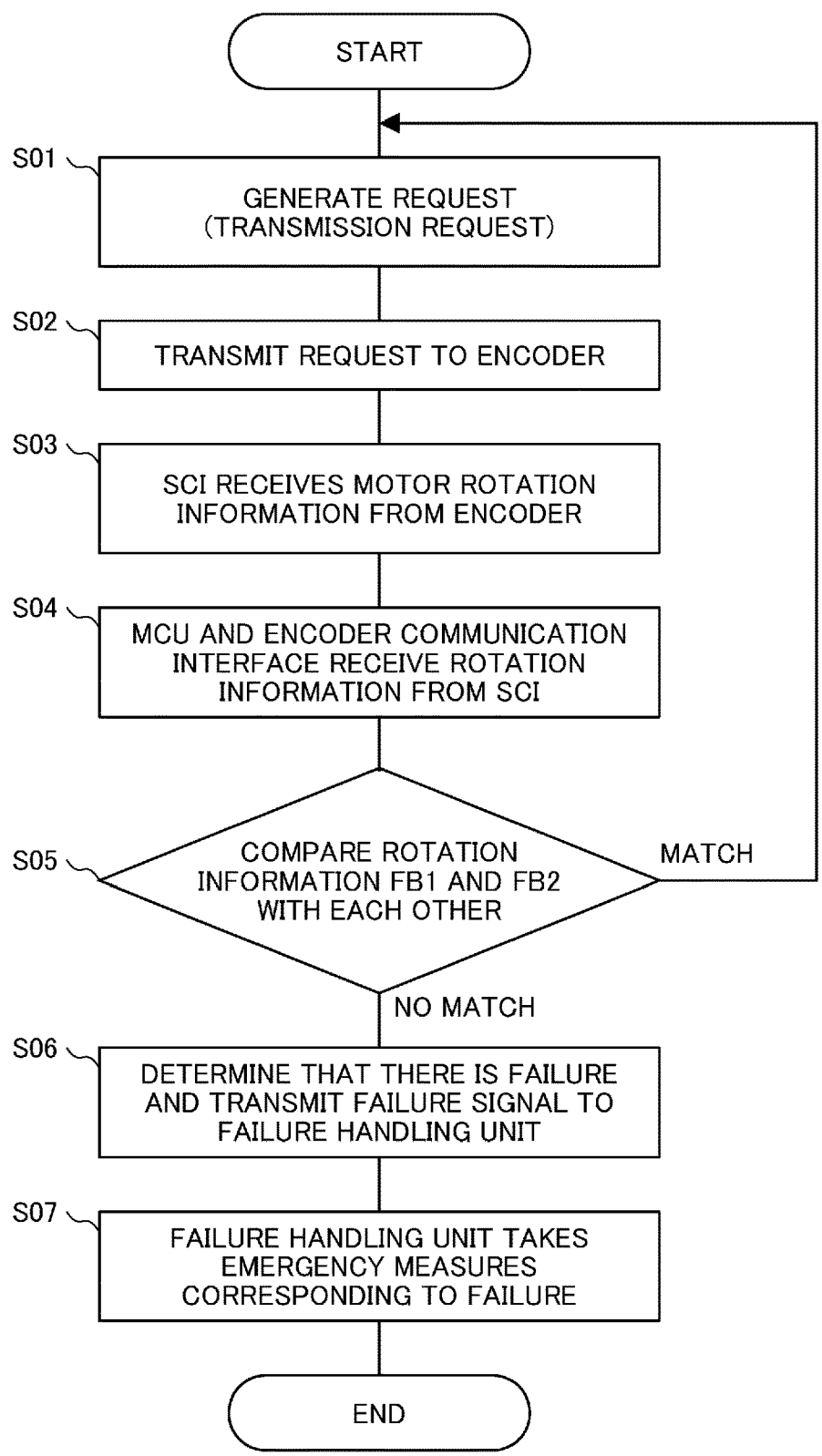
F I G. 2

F I G. 3
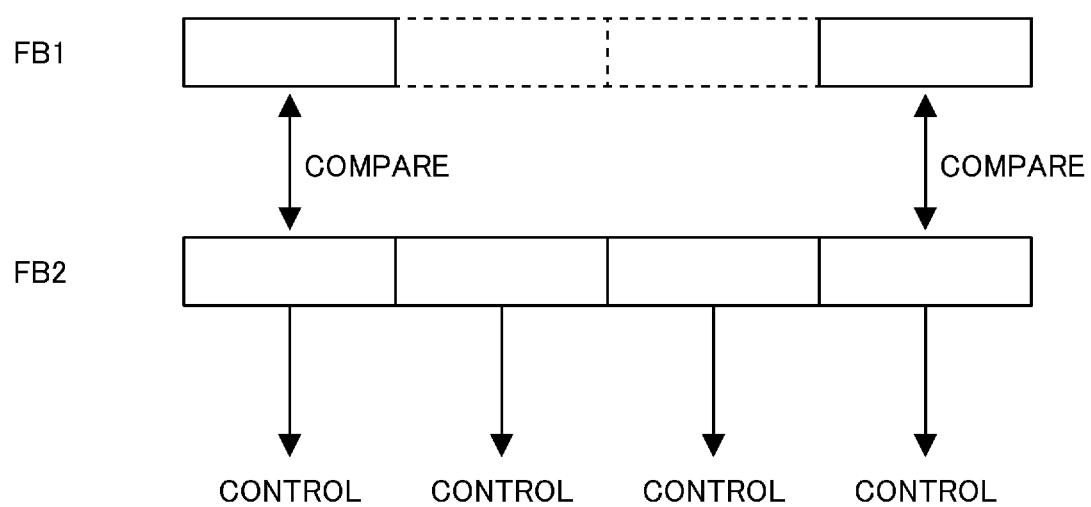

F I G. 5
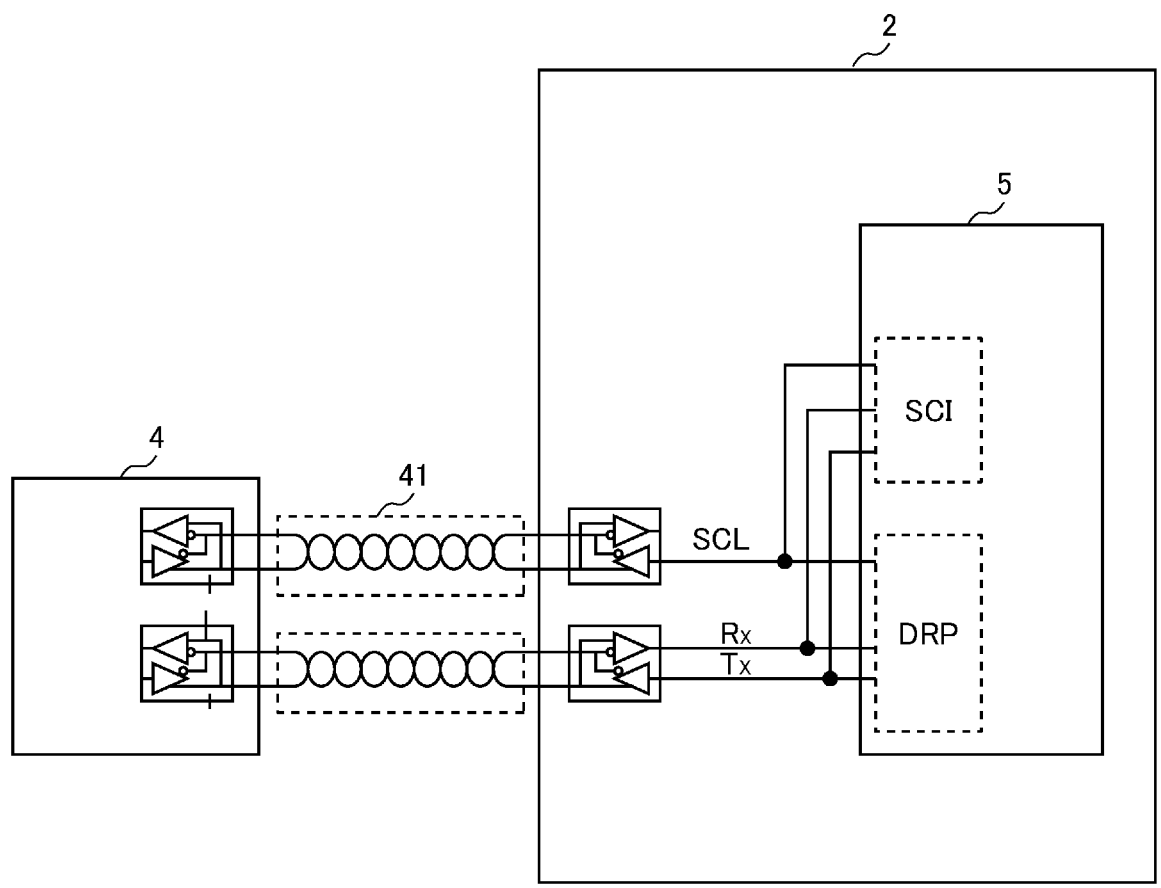

SERVO SYSTEM AND CONTROL METHOD FOR SERVO SYSTEM

TECHNICAL FIELD

The present invention relates to a servo system and a control method for a servo system.

BACKGROUND ART

A servo system includes an encoder that detects rotation information (rotation speed, rotation position) of a servo motor and a servo amplifier that imports (feeds back) the rotation information from the encoder, determines a servo motor control command based on the servo motor drive command information (operation command) and the fed-back rotation information, and controls the driving of the servo motor based on the control command. The servo amplifier is often configured to include a processor, such as a microprocessing unit (MPU), and a control unit that operates based on a control command from the processor.

Incidentally, in order to improve control accuracy in the servo system, it is necessary to generate control signals frequently and control the control signals, and it is necessary to feed back the rotation information from the encoder to the servo amplifier more quickly and reliably. However, when the fed-back rotation information (encoder output signal) is imported into the servo amplifier, it may not be possible to import the rotation information at high speed in the case of import through a software interface. For this reason, hardware such as an FPGA (field-programmable gate array) or an ASIC (application specific integrated circuit) is used as an interface (encoder communication interface) when inputting rotation information. For example, JP 2015-231255 A (Patent Document 1) discloses a configuration in which the output (rotation information) of an encoder is fed back to an MPU, which is a processor, through a field programmable gate array (FPGA).

CITATION LIST

Patent Document

Patent Document 1: JP 2015-231255 A

SUMMARY OF THE INVENTION

Problems to be Solved by the Invention

As shown in Patent Document 1, by using an encoder communication interface using hardware, such as an FPGA or an ASIC, as a communication interface, rotation information can be input at high speed. Therefore, since it is possible to perform high-speed processing, it is possible to realize servo precision control.

However, in the case of using an encoder communication interface that uses hardware such as an FPGA or an ASIC, it may be difficult to detect all hardware failures (for example, soft errors). Therefore, applying this to functional safety of high safety level leaves problems. In such a case, in order to ensure the functional safety of high safety level, it is conceivable that redundancy of the encoder communication interface using hardware, that is, two or more encoder communication interfaces, are provided and whether or not pieces of information thereof match each other is detected to increase the reliability of hardware failure detection and accordingly, improve the reliability of the entire servo system.

However, such a method based on the redundancy of the encoder communication interface using hardware causes problems such as an increase in the cost of the servo system and an increase in the installation area.

Therefore, it is an object of the present invention to provide a servo system and a control method for a servo system that are highly reliable with little cost increase.

Solutions to Problems

To give an example of the present invention, there is provided a servo system including: a servo motor; an encoder that detects rotation information of the servo motor; and a servo amplifier that controls driving of the servo motor using the rotation information. The servo amplifier includes an encoder communication interface configured by hardware, a processor for calculating a control command to control the servo motor based on an operation command and the rotation information input through the encoder communication interface, and a control unit for controlling driving of the servo motor based on the control command. The processor compares the rotation information directly received from the encoder with the rotation information input through the encoder communication interface and diagnoses whether or not there is a failure in the encoder communication interface based on a result of the comparison between both the pieces of rotation information.

In addition, to give another example of the present invention, there is provided a control method for a servo system that includes a servo motor and an encoder for detecting rotation information of the servo motor and drives the servo motor based on the rotation information of the encoder. The control method for a servo system includes: driving the servo motor based on an operation command and the rotation information input through an encoder communication interface using hardware; comparing the rotation information input through the encoder communication interface and the rotation information directly input from the encoder; and diagnosing whether or not there is a failure in the encoder communication interface based on a result of the comparison between both the pieces of rotation information.

Effects of the Invention

According to the present invention, it is possible to provide a servo system and a control method for a servo system that are highly reliable with little cost increase even when the servo system is driven by an encoder communication interface using hardware.

BRIEF DESCRIPTION OF THE DRAWINGS

FIG. 2 is a flowchart of an operation of the servo system according to the embodiment.

FIG. 3 is a diagram for explaining data thinning when comparing two types of rotation information in the first embodiment.

FIG. 5 is a diagram showing an example of a connection form between an encoder and a processor.

MODE FOR CARRYING OUT THE INVENTION

Figure 1:
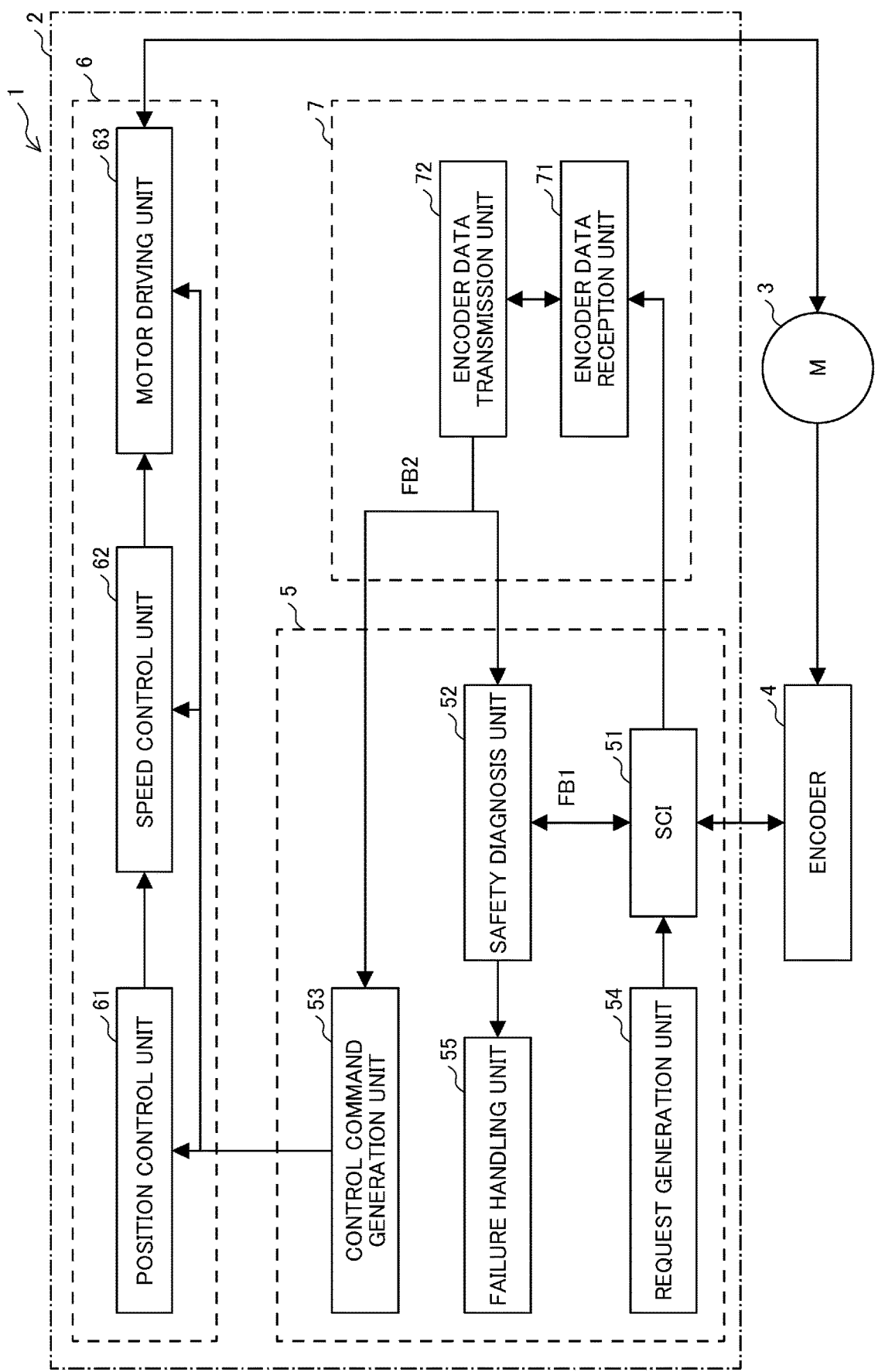
FIG. 1 is a diagram showing a servo system according to a first embodiment of the present invention.

Hereinafter, the present invention will be described in detail through specific embodiments. In addition, it should be noted that the present invention is not limited to the embodiments described below. That is, the present invention can be modified into various aspects including the embodiments described below. In addition, in diagrams used in the following explanation, the same reference numerals (numbers) are used for the same parts or components, and explanations of parts or components that have already been described may be omitted.

First Embodiment

Next, a first embodiment of the present invention will be described with reference to FIGS. 1 to 3. FIG. 1 is a diagram showing the overall configuration of a servo system according to a first embodiment of the present invention. FIG. 2 is a diagram showing the operation flow of the first embodiment. FIG. 3 is a diagram for explaining data thinning when comparing two types of rotation information in the first embodiment.

As shown in FIG. 1, a servo system 1 includes a servo amplifier 2, a servo motor 3, and an encoder 4 that detects rotation information (rotation position, rotation speed, and the like) of the servo motor 3. The encoder 4 receives a request from the servo amplifier 2 according to a communication protocol, and transmits rotation information corresponding to the request to the servo amplifier 2 in response to the request. The servo amplifier 2 imports (feeds back) the rotation information obtained through communication with the encoder 4, determines a servo motor control command based on the servo motor command information (operation command) and the rotation information imported, and controls the driving of the servo motor based on the control command.

Here, the servo amplifier 2 includes a microcontroller unit (MCU) 5 that is a control IC based on a microprocessor, a control unit 6 that controls the servo motor 3, and an encoder communication interface 7 that receives and processes feedback data of the rotation information (rotation position, speed) transmitted from the encoder 4. As the encoder communication interface 7, hardware such as an FPGA or an ASIC is used.

In this embodiment, the MCU 5 includes a serial communication interface (SCI) 51, a safety diagnosis unit 52 with a function of performing abnormality diagnosis (failure diagnosis) on the encoder communication interface 7, a control command generation unit 53 that calculates and generates a control command to the control unit 6, a request generation unit 54 that outputs a request to the encoder 4, and a failure handling unit 55 that takes measures when the safety diagnosis unit 52 diagnoses a failure (abnormality). In addition, the SCI 51 may be attached externally to the MCU 5, but the SCI 51 is provided at the input end in the MCU 5 herein for compactness.

When generating a control command in the control command generation unit 53, rotation information FB2 obtained from the encoder communication interface 7, to which the rotation information of the encoder 4 is input at high speed, is used to realize servo precision control.

The SCI 51 is an interface that receives serial data transmitted from the encoder communication protocol. The SCI 51 can perform full-duplex communication, and receives data (rotation information) serially transmitted from the encoder 4, stores the rotation information in the register of the SCI 51, and transmits the data stored in the register to the MCU 5 and the encoder communication interface 7 in FIFO order. As described above, in this embodiment, the rotation information can be transmitted from one SCI 51 to the MCU 5 and the encoder communication interface 7. Since the rotation information is shared so as to be able to be obtained from one SCI 51, the circuit becomes simple, which is preferable in terms of cost and control.

The safety diagnosis unit 52 performs a safety diagnosis to ensure the safety of the servo amplifier 2. The safety diagnosis includes detecting failures in the hardware circuit of the servo amplifier 2, detecting failures related to the internal software of the MCU 5, and diagnosing failures in the encoder communication interface 7. Among these safety diagnoses, the failure diagnosis on the encoder communication interface 7 is performed by comparing rotation information FB1, which is directly input (fed back) to the MCU 5 through the SCI 51, with the rotation information FB2, which is input to the MCU 5 through the encoder communication interface 7. The failure handling unit 55 takes appropriate measures, such as emergency stop of the servo motor, based on the diagnosis result of the safety diagnosis unit 52.

The control command generation unit 53 generates control commands to a position control unit 61, a speed control unit 62, and a motor control unit 63 of the control unit 6. The control commands are generated based on the operation command and the rotation information FB2 obtained through the encoder communication interface 7. Specifically, a control command is generated (calculated) to eliminate the difference between the operation command and the rotation information.

The request generation unit 54 generates a request corresponding to data to be received according to the encoder protocol, and transmits the request to the encoder 4 through the SCI 51. Requests include not only a request to transmit rotation information for normal control but also a request to transmit test information. The encoder 4 transmits rotation information corresponding to the request to the servo amplifier 2. Specifically, the rotation information corresponding to the request is transmitted to the SCI 51 provided at the input end of the MCU 5.

The control unit 6 includes a position control unit 61, a speed control unit 62, and a motor control unit 63. The position control unit 61, the speed control unit 62, and the motor control unit 63 receive control commands generated by the control command generation unit 53 of the MCU 5 and control the position, speed, and torque of the servo motor 3.

The encoder communication interface 7 includes an encoder data reception unit 71 and an encoder data transmission unit 72. The encoder data reception unit 71 receives data of the rotation information transmitted from the encoder through the SCI 51. The encoder data transmission unit 72 transmits the received rotation information FB1 to the MCU 5 through an I/O port such as an FPGA or an ASIC. The MCU 5 stores the rotation information FB1 in a memory (not shown) in the input order.

In addition, in FIG. 1, the configuration of the MCU 5 is shown in a functional block format for easy understanding. In practice, however, the MPU or CPU performs motor control and failure diagnosis according to programs stored in the ROM.

Next, failure diagnosis on the encoder communication interface 7 using hardware in the first embodiment will be described with reference to the operation flow shown in FIG. 2. FIG. 2 is a flowchart showing the operation of the failure diagnosis process of the MCU 5.

In FIG. 2, in step S01, the request generation unit 54 generates a request R for acquiring rotation information required for motor control.

Then, in step S02, the request generation unit 54 transmits the request R to the encoder 4 through the SCI 51. Then, the encoder 4 transmits rotation information corresponding to the request to the servo amplifier 2. In step S03, the rotation information (rotation position, speed, and the like) transmitted from the encoder 4 is received by the SCI.

Then, in step S04, the rotation information stored in the register in the SCI 51 is transmitted to the encoder communication interface 7 in FIFO order. At the same time, the same rotation information is also imported into the MCU 5. Here, it is assumed that the rotation information transmitted to the encoder communication interface 7 and output from the encoder data transmission unit 72 is FB2 and the rotation information directly imported and stored in the MCU 5 is FB1.

Then, in step S05, the safety diagnosis unit 52 compares the rotation information FB2 obtained through the encoder communication interface 7 with the rotation information FB1 received by the SCI 51 and imported into the MCU 5. Then, when FB1 and FB2 match each other in step S05, the safety diagnosis unit 52 determines that there is no failure (abnormality) in the encoder communication interface 7 and returns to step S01. The failure diagnosis routine shown in steps S01 to S05 is continued while the servo motor is in operation.

When a state in which the two pieces of compared data (rotation information FB1 and FB2) do not match each other occurs in step S05, the safety diagnosis unit 52 determines that the encoder communication interface 7 has failed, and proceeds to the next step S06. In addition, match in this case means not only a case where the two pieces of data completely match each other (that is, a case where FB1−FB2=0) but also a case where the two pieces of data can be considered to match each other (a case where the difference between the two pieces of data is equal to or less than a predetermined threshold value).

In step S06, the failure signal of the encoder communication interface 7 is transmitted to the failure handling unit 55.

Then, in step S07, the failure handling unit 55 takes appropriate emergency measures for the servo system based on the failure signal. For example, the failure handling unit 55 cuts off the power supplied to the servo motor 3 to stop the servo motor. In addition, at the same time, measures, such as notifying a higher-level device that manages the entire system of the failure state, are taken.

In this manner, while the servo system is in operation, the failure diagnosis operation is continuously performed in accordance with the servo motor operation control. Then, when it is determined that there is a failure (when the pieces of data of FB1 and FB2 do not match each other), this can be diagnosed as a failure and emergency measures can be taken.

Next, a method for comparing rotation information output from the encoder 4 at the same timing when comparing FB1 and FB2 in the diagnostic operation of the safety diagnosis unit 52 (comparison determination operation in step S05) will be described. As described above, since the hardware-based encoder communication interface 7 performs a high-speed operation, the number of pieces of rotation information FB2 that can be obtained per unit time is greater than the number of pieces of rotation information FB1 that are directly input to the MCU 5. Therefore, in order to more accurately compare FB1 and FB2 with each other, a more accurate diagnosis can be made by comparing FB1 and FB2 in accordance with the data thinning timing of FB2. FIG. 3 is a diagram for explaining this thinning process and data comparison.

In FIG. 3, the lower side is the rotation information FB2 that is the output of the encoder communication interface 7, and the upper side is the rotation information FB1 directly input to the MCU 5 from the SCI 51.

As shown in FIG. 3, in order to match the data comparison timings on both sides, thinning processing is performed at a thinning rate for setting the rotation information FB2, which is the output of the encoder communication interface 7, at a ratio of data communication period time and a plurality of period times for the rotation information FB1 directly input to the MCU 5. Then, after a period of time longer than the set thinning rate, the thinned-out rotation information FB2 and FB1 are compared with each other. By performing such thinning processing, a failure of the encoder communication interface 7 can be determined more accurately. Thinning processing on FB2 can be set in advance. FIG. 3 shows an example in which the thinning ratio is 1:3, and the rotation information FB2 of one period among three periods is used for comparison with FB1.

According to the first embodiment of the present invention described above, even when the servo system is driven by the encoder communication interface using hardware, it is possible to realize a highly reliable servo system with little cost increase.

Second Embodiment

Figure 4:
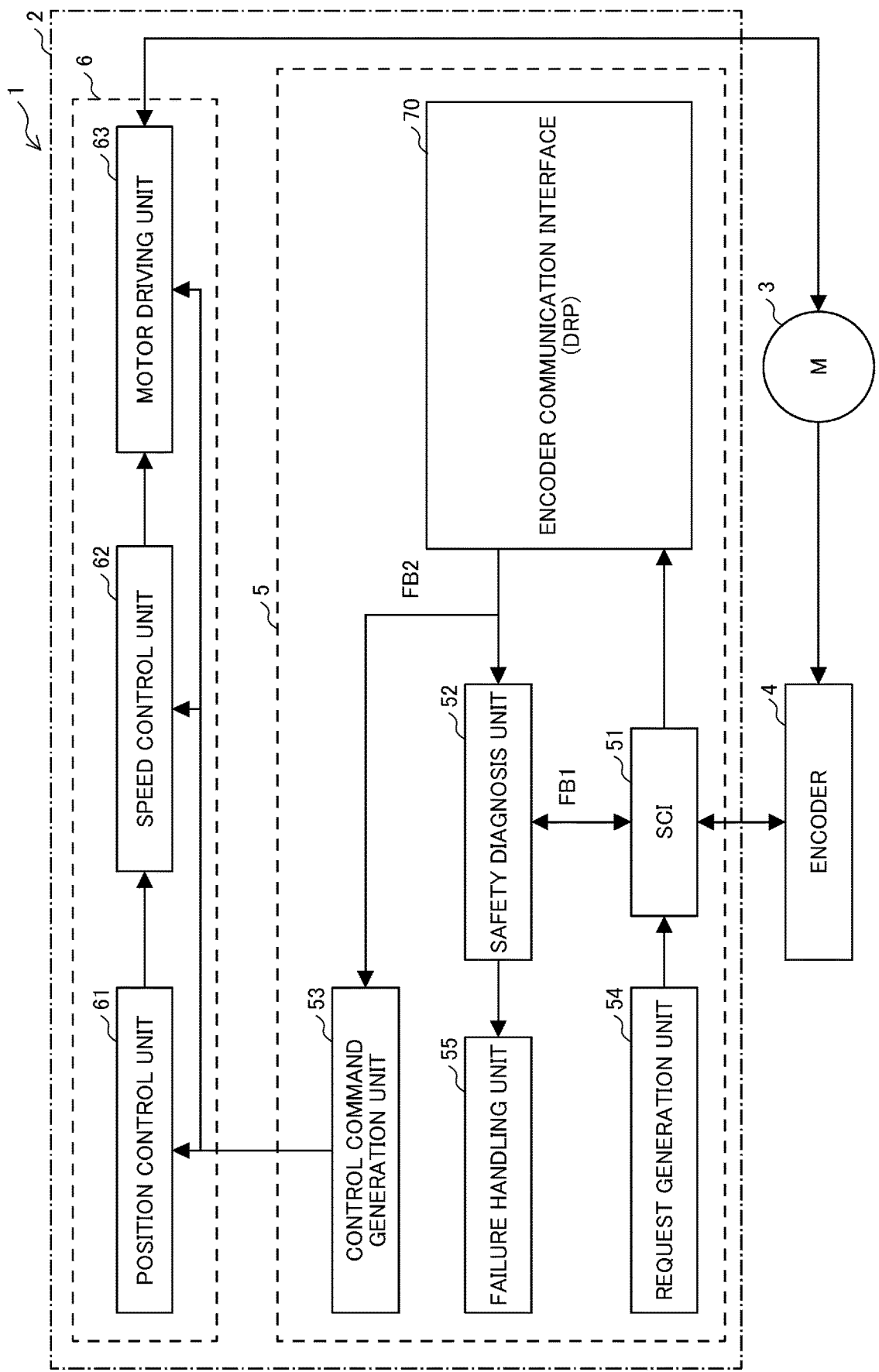
FIG. 4 is a configuration diagram showing a servo system according to a second embodiment of the present invention.

Next, a second embodiment of the present invention will be described with reference to FIG. 4. FIG. 4 is a configuration diagram of a servo system according to a second embodiment. Since the basic configuration of the second embodiment is the same as that of the first embodiment already described, explanation thereof will be omitted, and parts of the configuration that are different from the first embodiment will be mainly described herein.

In the second embodiment shown in FIG. 4, instead of the encoder communication interface 7 using hardware in FIG. 1, an encoder communication interface 70 having a similar function is provided in the MCU 5. That is, as the encoder communication interface 70 built into the MCU 5, a dynamically reconfigurable processor (DRP) is used. The DRP (dynamically reconfigurable processor) is hardware that executes an application while dynamically switching connections between calculators. The internal circuitry of a typical DRP includes 8-bit PE (processor element) arrays arranged in a grid, an STC (state transition controller) for dynamically selecting these, and a RAM and a memory controller for supplying data to the PEs. In addition, since the configuration of the DRP itself is known, detailed explanation of the DRP will be omitted herein.

The operation of the second embodiment is similar to that of the first embodiment and overlaps what has already been described, and accordingly, detailed explanation thereof will be omitted herein. In addition, since the operation flow of the second embodiment is similar to that shown in FIG. 2, the explanation of the operation will also be omitted. In addition, thinning out data in order to compare the pieces of rotation information output from the encoder 4 at the same timing when comparing FB1 and FB2 as shown in FIG. 3 in the diagnostic operation of the safety diagnosis unit 52 is also the same as in the first embodiment. That is, in the second embodiment as well, the thinning processing is performed as shown in FIG. 3. Therefore, explanations regarding these will also be omitted.

In the second embodiment shown in FIG. 4, the encoder communication interface 70 configured by the DRP is built into the MCU 5, and can have high processing power of hardware logic and high flexibility and functional expandability similar to a CPU.

In addition, in the second embodiment as well, as in the case of the first embodiment, an SCI for importing rotation information into the encoder communication interface 70 configured by the DRP and an SCI for importing into the MCU 5 are not provided independently, and one common SCI 51 is used. In addition, since the built-in encoder communication interface 70 that supports the encoder protocol using DRP eliminates the need for external hardware (FPGA, ASIC, and the like), it is possible to realize compactness and reduce some hardware costs.

FIG. 5 shows an example of a form of connection with an encoder using, for example, clock synchronous serial communication. For connection between the encoder 4 and the MCU 5, for example, an actuation signal according to the RS-485 standard is used, and wiring therebetween is performed by using a twisted pair cable 41. Therefore, there is an effect that the influence of noise and the like can be reduced. The MCU 5 includes input/output pins corresponding to both the DRP and SCI functional blocks, and each signal (SCL, Rx, Tx) of the RS-485 transceiver may be connected in parallel to both the input/output pins.

Figure 6:
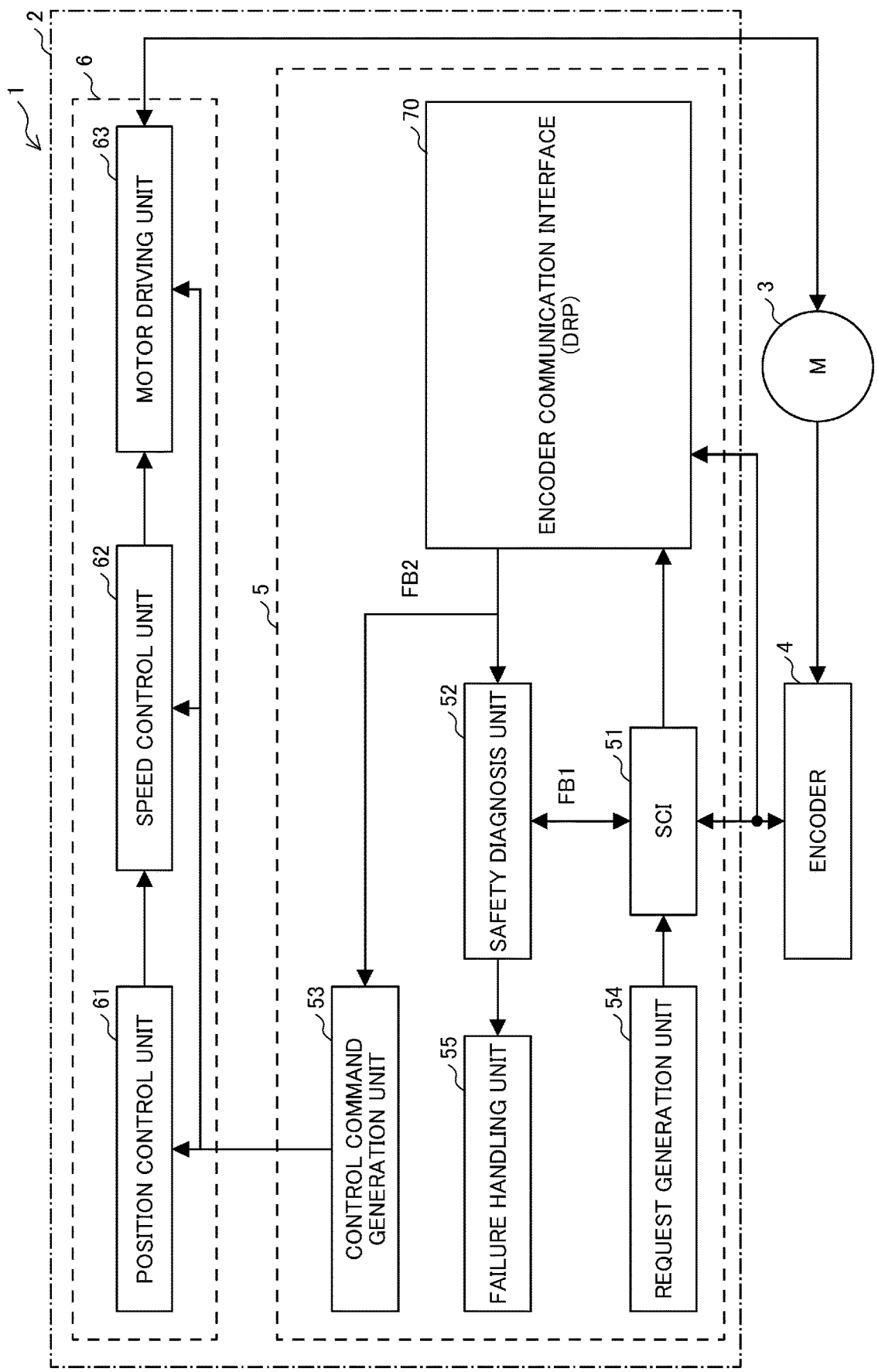
FIG. 6 is a configuration diagram showing a servo system in the connection form of FIG. 5.

FIG. 6 is a configuration diagram of a case where the MCU shown in FIG. 5 includes DRP and SCI input/output pins and each signal (SCL, Rx, Tx) of the RS-485 transceiver is connected in parallel to both the input/output pins.

According to the second embodiment of the present invention described above, it is possible to provide a servo system that has the same effects as in the first embodiment and is compact and less expensive.

REFERENCE SIGNS LIST

1 Servo system
2 Servo amplifier
3 Servo motor
4 Encoder
5 Microcontroller unit
6 Control unit
7 Encoder communication interface
41 Twisted pair cable
51 Serial communication interface
52 Safety diagnosis unit
53 Control command generation unit
54 Request generation unit
55 Failure handling unit
61 Position control unit
62 Speed control unit
63 Motor control unit
70 Encoder communication interface
71 Encoder data reception unit
72 Encoder data transmission unit

The invention claimed is:

1. A servo system, comprising:
a servo motor;
an encoder that detects rotation information of the servo motor; and
a servo amplifier that controls driving of the servo motor using the rotation information,
wherein the servo amplifier includes an encoder communication interface configured by hardware, a processor for calculating a control command to control the servo motor based on an operation command and the rotation information input through the encoder communication interface, and a control unit for controlling driving of the servo motor based on the control command,
wherein the processor compares the rotation information directly received from the encoder with the rotation information input through the encoder communication interface and diagnoses whether or not there is a failure in the encoder communication interface based on a result of the comparison between both the pieces of rotation information, and
wherein a serial communication interface that receives and stores the serial rotation information transmitted from the encoder and transmits the stored data in FIFO order to the processor and the encoder communication interface is provided.

2. The servo system according to claim 1,
wherein a microcontroller unit is used as the processor.

3. The servo system according to claim 1,
wherein a request generation unit that generates a request for determining data to be received of the rotation information is provided in the processor, and
the request is transmitted to the encoder through the serial communication interface so that the encoder transmits the rotation information corresponding to the request to the serial communication interface.

4. The servo system according to claim 1,
wherein the serial communication interface is provided at an input end of the processor.

5. The servo system according to claim 1,
wherein information obtained by thinning out the rotation information input through the encoder communication interface is compared with the rotation information directly received from the encoder.

6. The servo system according to claim 1,
wherein when the failure is diagnosed, emergency measures are taken for the servo system.

7. The servo system according to claim 1,
wherein the processor includes input/output pins corresponding to functions of a dynamically reconfigurable processor and a serial communication interface, and
the serial rotation information transmitted from the encoder is received by the input/output pins.

8. A servo system comprising:
a servo motor;
an encoder that detects rotation information of the servo motor; and
a servo amplifier that controls driving of the servo motor using the rotation information,
wherein the servo amplifier includes an encoder communication interface configured by hardware, a processor for calculating a control command to control the servo motor based on an operation command and the rotation information input through the encoder communication interface, and a control unit for controlling driving of the servo motor based on the control command,
wherein the processor compares the rotation information directly received from the encoder with the rotation information input through the encoder communication interface and diagnoses whether or not there is a failure in the encoder communication interface based on a result of the comparison between both the pieces of rotation information, wherein the encoder communication interface is built into the processor, wherein a dynamically reconfigurable processor is used as the encoder communication interface, and wherein a serial communication interface that receives and stores the serial rotation information transmitted from the encoder and transmits the stored data in FIFO order to the processor and the encoder communication interface is built into the processor.

9. A control method for a servo system that includes a servo motor and an encoder for detecting rotation information of the servo motor and drives the servo motor based on the rotation information of the encoder, the method comprising:

driving the servo motor based on an operation command and the rotation information input through an encoder communication interface using hardware;

comparing the rotation information input through the encoder communication interface and the rotation information directly input from the encoder; and diagnosing whether or not there is a failure in the encoder communication interface based on a result of the comparison between both the pieces of rotation information, wherein the rotation information is imported into the encoder communication interface through a serial communication interface that receives and stores the serial rotation information transmitted from the encoder and transmits the stored data in FIFO order.

10. The control method for a servo system according to claim 9, wherein a request for determining data to be received from the encoder is generated, the request is transmitted to the encoder, and the rotation information corresponding to the request is input from the encoder.

11. The control method for a servo system according to claim 9, wherein information obtained by thinning out the rotation information input through the encoder communication interface is compared with the rotation information directly received from the encoder.

12. The control method for a servo system according to claim 9, wherein the failure is diagnosed, emergency measures are taken for the servo system.

* * * * *